United States Patent [19]

Wythoff

[11] Patent Number: 4,888,935

[45] Date of Patent: Dec. 26, 1989

[54] METHOD FOR SEALING A LID TO A CONTAINER

[75] Inventor: Willem Wythoff, Medford, N.J.

[73] Assignee: Campbell Soup Company, Camden, N.J.

[21] Appl. No.: 224,762

[22] Filed: Jul. 25, 1988

[51] Int. Cl.$^4$ .......................... B65B 7/28; B65B 51/10
[52] U.S. Cl. ...................................... 53/478; 53/329; 53/373
[58] Field of Search .................. 53/319, 329, 478, 489, 53/373; 156/69

[56] References Cited

U.S. PATENT DOCUMENTS

| | | | |
|---|---|---|---|
| 3,060,652 | 10/1962 | Eckman | 53/478 |
| 3,471,992 | 10/1969 | Amberg et al. | 53/478 |
| 3,720,038 | 3/1973 | Bryan, Jr. et al. | 53/329 X |
| 4,065,909 | 1/1978 | Mueller | 53/487 X |
| 4,338,765 | 9/1982 | Ohmori et al. | 53/487 X |
| 4,362,002 | 12/1982 | Rowl et al. | 53/478 |
| 4,599,123 | 7/1986 | Christensson | 53/489 X |
| 4,605,142 | 8/1986 | Itoh et al. | 220/359 |
| 4,640,733 | 2/1987 | Bogren | 53/489 X |
| 4,767,478 | 8/1988 | Christine | 156/69 |

FOREIGN PATENT DOCUMENTS 2129805 12/1972 Fed. Rep. of Germany ........ 53/329

*Primary Examiner*—John Sipos
*Assistant Examiner*—Beth Bianca
*Attorney, Agent, or Firm*—Albert L. Free

[57] ABSTRACT

A dished foil lid is secured to a container having a flange at its top by placing the lid over the open top of the container with the periphery of the foil on the flange and the dished portion of the lid extending downwardly into the container, and by applying a heating tool to the exterior of the foil adjacent the inner edge of the top of the container. The heating tool preferably has a tapered tip portion so that when it is urged into the depression formed by the dished portion of the lid, the side surfaces of the tip bear against the part of the foil adjacent to the inner edge of the top of the container. The time, temperature and pressure of application of the tip are such as to cause the adjacent inner edge of the container to soften and, upon subsequent removal of the tool, a narrow seal is formed between lid and container at the inner edge of the top of the container. The resultant seal is not only uniform and hermetic, but is easily parted when one later peels off the lid.

4 Claims, 1 Drawing Sheet

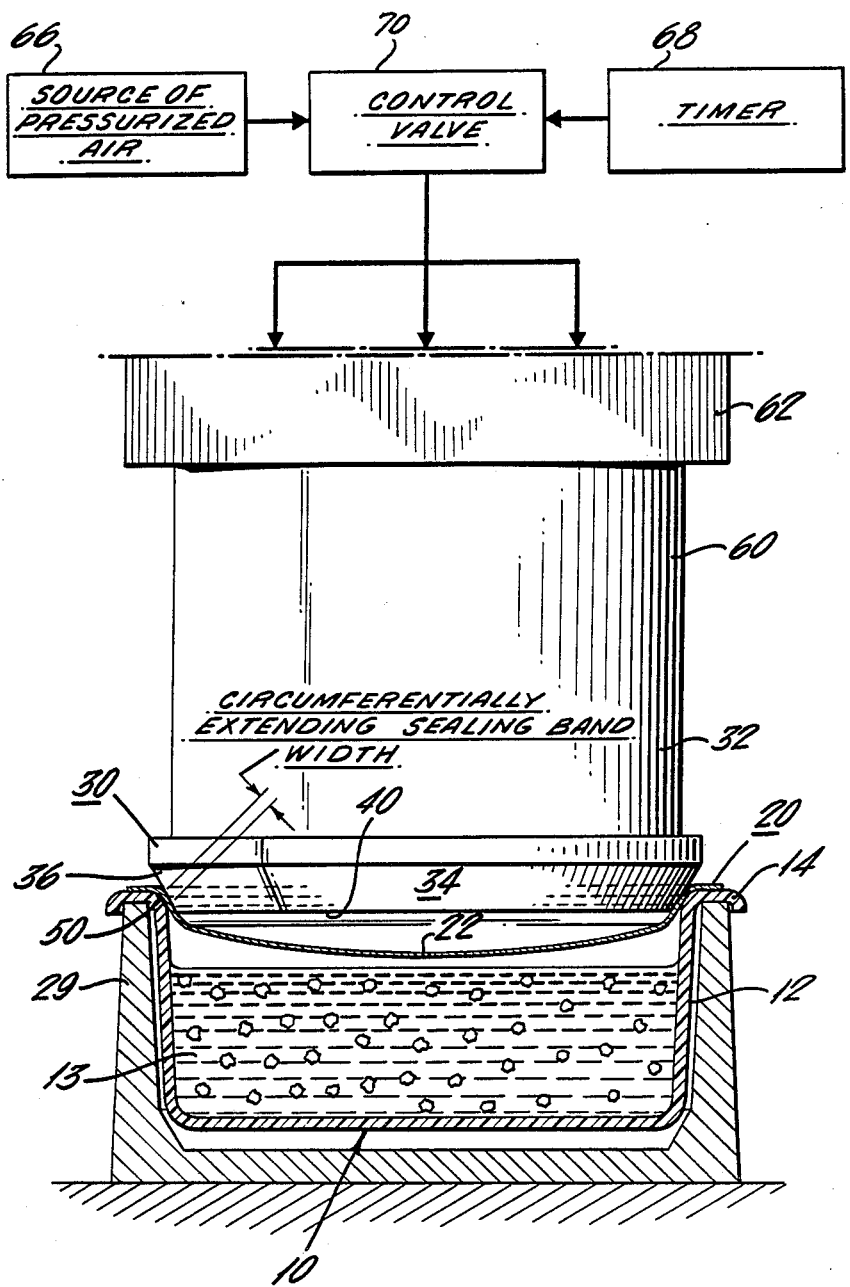

METHOD FOR SEALING A LID TO A CONTAINER

BACKGROUND OF THE INVENTION

There are a variety of applications in which it is desirable to provide a hermetic seal across the open end of a container. As one example, food products to be sold in a plastic container are often provided with a metallic foil lid or cover which extends across the open end of the container and is heat sealed to the open-top end of the container; typically, the container will be provided with a flange about its open end to which the heat seal can be formed. Heat sealing has been accomplished by applying a generally cylindrical heating tool to the portion of the lid which overlies the flange, and urging the hot tool against the lid material whereby the heat from the tool is conducted through the metallic lid to melt the adjacent underlying plastic material and, upon subsequent cooling, forming the desired heat seal between flange and metallic lid. Typically, the pressure applied by the heat-sealing tool is counter-balanced by a support on the opposite side of the container flange.

It has also been known to utilize a so-called "dished" lid, which is formed with a depression or dished-out portion throughout most of its extent so that the edge portions may provide the desired seal but the remainder of the lid extends downwardly more nearly into contact with the contents of the container, thus reducing the amount of air or other gas within the container after sealing and thereby reducing the adverse effects of the gaseous material upon the product and/or any tendency for expansion of the gas upon subsequent heating to loosen the lid. Because of its dome-like shape it also resists bending forces due to increases of internal pressure, and thus preserves its pleasing smooth appearance.

While such procedures and containers have been found suitable for various purposes, they have been found to be subject to defects which sometimes result in loosened seals, at least at certain points along the circumference of the seal, and therefore in a breach of the desired hermetic condition. This is believed to be at least in part due to variations in thickness of the plastic material of the flange. In any event, it has commonly been found necessary to form a heavier seal, as by increasing one or more of the parameters of temperature, time and applied pressure, so as to assure that even the portions less likely to seal well are in fact well sealed. While this is capable of providing the desired strength and completeness of seal, the resultant seal is typically so strong that it is difficult for the user to peel off the lid, as is customarily done later to gain access to the product in the container.

Accordingly, it is an object of the present invention to provide new and useful method and apparatus for sealing a lid or closure to the open end of a container.

Another object is to provide such method and apparatus which provide complete, high quality seals and which, nevertheless, are relatively easy to peel off and remove when access to the interior of the container is desired.

Another object is to provide such method and apparatus in which the time for forming the seal is reduced, thus enabling a higher rate of sealing of a series of successive containers.

It is also an object to provide a container assembly comprising a container and a closure heat-sealed thereto, in which the seal is complete and strong yet the closure can readily be peeled off when desired.

BRIEF SUMMARY OF THE INVENTION

These and other objects of the invention are achieved by the provision of a method and apparatus which provides heat sealing limited to the inner edge of the top opening of the container. This is accomplished in connection with a lid of the so-called dished type, having a depression extending inwardly of the container when the lid is in place. Using such a lid, a heating tool is provided with a tip having side surfaces which slope inwardly along the direction toward the end of the tool such that, with the lid in place, the tool can be advanced into the dished out portion of the lid until the sloping side surfaces contact the part of the lid adjacent to the inner edge of the top of the container. The heated tool is then pressed inwardly, so as to distend and slightly stretch the upper end of the container, thus providing strong intimate contact between the tool, the lid and the underlying inner edge of the container during the heating process. This produces melting or softening of a narrow band of the container extending around the inner edge of its upper end. The tool is then lifted upwardly and outwardly, and the softened or molten plastic resolidifies, forming a narrow but continuous bond to the lid, extending completely around the circumference of the inner edge of the container, as desired for good sealing. However, because the bond is limited to a very narrow band on the inner edge of the container, the lid can subsequently be peeled off quite readily, without excess force, when access to the contents is desired. Not only is the seal complete and reproducible, but it is also made in a very short time, so that the rate of sealing of successive containers is very high.

Preferably, the lid or closure is of a thermally conductive material such as a metallic foil, and the container material is a synthetic plastic.

BRIEF DESCRIPTION OF FIGURES

These and other features of the invention will be more readily understood from a consideration of the following detailed description, taken with the accompanying drawings, in which:

FIG. 1 is a vertical sectional view showing a lid in the process of being heat sealed to a container according to the present preferred embodiment of the invention, and including a suitable preferred form of fixture for holding the container during this process and a preferred form of the heating tool for accomplishing the heat sealing, it being understood that all of the parts shown are circularly symmetrical about a central vertical axis and hence need not be shown in other views.

DESCRIPTION OF SPECIFIC EMBODIMENTS

Referring now to the specific embodiment of the invention shown by way of example only, and without thereby in any way limiting the scope of the invention, FIG. 1 shows a container in a form of a plastic bowl 10 having a substantially cylindrical body portion 12 for containing the product 13, and with an integral plastic annular flange 14 at its upper end. As an example, the plastic material may be of polyester, about 0.030 inch in thickness, coated with a thin layer of polypropylene, the body portion 12 having an inner diameter of about 4.5 inches at its top and the flange 14 having a width of about ⅜ inch. A suitable height of the container is around 2 inches, as an example.

The dished lid or closure 20 is of a thin heat-transmissive material such as metallic foil; in one preferred embodiment it is aluminum foil about 0.005 inch in thickness, covered with a thin coating of polypropylene. It has a dished central portion 22 formed therein and its outer diameter is intermediate the inner and outer diameters of flange 14. The product 13 may be a food product, for example a soup. The bowl is held by a back-up stand 29 in the form of a closed-bottomed, open-topped cylinder of a strong material such as stainless steel, the walls of which fit under the flange 14 of bowl 10.

The heat sealing tool 30 comprises a main body portion 32 and a tip portion 34; the body and tip portions are heated by an internal electrical heater (not shown) which may be of conventional form. The tip portion 34 has inwardly sloping or bevelled surfaces 36, which are of such a diameter and so positioned with respect to the lower extreme end 40 of the tip portion that when the tip portion is placed in position as shown in the figure, its slanted side surfaces 36 bear against the lid 20 at a position adjacent the inner edge of the top open end of the container. Accordingly, as the tip of the heat sealing tool is urged downwardly toward the interior of the container, the sloping edges of the tip exert a uniform pressure on the foil such as to press the foil against the inner edge of the top of the container, and even to stretch or distort the container slightly so it conforms exactly to the outer periphery of the tip, which in this example is circular. This assures that the heating tip, the lid and the inner edge of the open end of the container all bear against each other substantially uniformly around the entire circumference of the container. The heat from the tip then flows rapidly through the thermally conductive lid and produces momentary softening or melting of the adjacent portion of the container, limited to a narrow band along the inner edge of the top of the container; this line or edge where the sealing occurs is designated as 50 in the Figure, and may be about 1/16 inch in width.

After the tip of the heating tool has been thus applied, with a suitable downward pressure, at a suitable temperature and for a suitable time, it is removed upwardly, and the softened or molten plastic resolidifies, forming the desired strong hermetic seal entirely around the periphery of the top of the container. However, being well-defined and of a relatively small width, the seal can easily be parted later, when the user wishes to peel off the lid for access to the contents.

The desired pressure of the tool against the lid and container during the heat-sealing operation may be provided by way of a conventional piston 60 reciprocating in a conventional pneumatic cylinder 62, to which pressurized air is supplied from a source 66 for times determined by a conventional timer 68 controlling a conventional control valve 70.

A suitable force, time and temperature for the materials and dimensions mentioned in the foregoing are as follows:
Total force urging tool tip against lid and top end of container=about 1,000 pounds
Time of application of tool=about 0.75 second
Temperature reached by adjacent container edge=about 400° F.

Accordingly, there has been provided a method and apparatus which produce an assembly of a lid to container in which the forces required to peel away the lid at a later time are reduced, yet the seal itself is of high integrity and reliability throughout; it also provides for shorter sealing times, thus enabling one to process a greater number of containers in a given length of time. In addition it has been found that the lid seal exhibits a higher resistance to internal pressure increases such as occur due to the heating of the air or other gas in the container during the subsequent sterilization of the food in the container, which is usually accomplished by heating the entire assembly.

While a circular shape of the container and tip is presently preferred, it is possible to utilize containers of other cross-sectional shapes, fitted with tips of other corresponding cross-sectional shapes, to achieve similar operations and advantages.

Also, the dished foil need not have a domed or curved shape, but instead may be flat-bottomed with vertical sides so as to overly closely substantially the entire horizontal top surface of the product in the container, thus reducing the volume of head space above the product as is desirable in some cases.

Accordingly, it will be understood that while the invention has been described with particular reference to specific embodiments in the interest of complete definiteness, it may be embodied in a variety of forms diverse from those specifically shown and described, without departing from the spirit and scope of the invention as defined by the claims.

What is claimed is:

1. The method of sealing to the open top of a plastic container a dished heat-conductive lid extending across and against said open top of said container with the dished portion of said lid extending inward of said container, said top of said container having a top inner edge portion which is convex upwardly and inwardly of said container, said method comprising:

inserting into said dished portion the tip of a hot heat-sealing tool to contact selectively only the area of said lid overlying said convex inner edge portion of said container, thereby to soften the underlying plastic material only at said convex inner edge, and thereafter removing said tool to permit resolidification of said plastic material and consequent formation of a seal between said inner edge and said lid;

wherein said tip of said tool is tapered inwardly and has a cross-section geometrically similar to the shape of the innermost circumference of said inner edge portion, the diameter of said tip and the angle of its inward taper being such that the outer side surface of said tip contacts only said area of said lid overlying said convex inner edge portion of said container, substantially tangentially along a line of contact therewith; and wherein said tool is inserted with sufficient force to press said lid against said inner edge portion of said top of said container to provide direct contact between said tool tip and said lid and between said lid and only said inner edge portion during said heating by said tool;

whereby said seal between said lid and said inner edge portion of said top of said container, after said resolidification, extends completely around said inner edge portion and is confined to a narrow line region, said lid therefore being susceptible of easy removal when desired.

2. The method of claim 1, wherein the material of said inner edge of said container open end is a synthetic plastic, and is raised into a temperature range of from about 300° to about 420° by said heated tool.

3. The method of claim 2, wherein said lid is a metallic foil.

4. The method of claim 2, wherein said foil is of aluminum.

* * * * *